US005845295A

United States Patent [19]
Houseman et al.

[11] Patent Number: 5,845,295
[45] Date of Patent: Dec. 1, 1998

[54] SYSTEM FOR PROVIDING INSTANTANEOUS ACCESS TO A SNAPSHOT OF DATA STORED ON A STORAGE MEDIUM FOR OFFLINE ANALYSIS

[75] Inventors: David Leon Houseman, Chester Springs; Duane Jay McCrory, Malvern, both of Pa.

[73] Assignee: Unisys Corporation, Blue Bell, Pa.

[21] Appl. No.: 703,698

[22] Filed: Aug. 27, 1996

[51] Int. Cl.$^6$ .................................................. G06F 17/30
[52] U.S. Cl. ............................... 707/204; 707/203; 711/4
[58] Field of Search .................................. 707/205, 202, 707/10, 102, 203, 104, 204, 4; 395/703; 711/4

[56] References Cited

U.S. PATENT DOCUMENTS

| | | | |
|---|---|---|---|
| 5,043,871 | 8/1991 | Nishigaki et al. | 364/200 |
| 5,155,678 | 10/1992 | Fukumoto et al. | 707/202 |
| 5,163,148 | 11/1992 | Walls | 395/600 |
| 5,241,668 | 8/1993 | Eastridge et al. | 707/202 |
| 5,327,551 | 7/1994 | Kaneko | 395/575 |
| 5,337,197 | 8/1994 | Brown et al. | 360/48 |
| 5,420,996 | 5/1995 | Aoyagi | 395/425 |
| 5,435,004 | 7/1995 | Cox et al. | 707/205 |
| 5,448,718 | 9/1995 | Cohn et al. | 711/4 |
| 5,530,939 | 6/1996 | Mansfield et al. | 707/201 |
| 5,560,005 | 9/1996 | Hoover et al. | 707/10 |
| 5,649,200 | 7/1997 | Leblang et al. | 395/703 |
| 5,692,181 | 11/1997 | Anand et al. | 707/102 |
| 5,745,755 | 4/1998 | Covey et al. | 707/203 |

OTHER PUBLICATIONS

Edelstein, Herb "The Challenge of Replication, Part. 1", DBMS, v8, n3, p.46(5), Mar. 1995.
Edelstein, Herb "The Challenge of Replication, Part. II", DBMS, v8, n4, p.62(6), Apr. 1995.
Olson, Jack "Building a Database Topology Strategy", Database Programming & Design, v8, n6, p.52(7), Jun. 1995.
McCabe et al. "The Role of Tools in Development of a Data Warehouse", Assesment of Software, 1996 Int'l Symposium p. 139–145, 1996.
Kuno et al. "Augumented Inherited Multi–Index Structure for Maintenace of Materialized Path Query Views", Research Issues in Data Engineering, 1996 Workshop, p. 128–137, 1996.
Subramanian et al. "Strategic Planning for Data Warehousing in the Public Sector", System Sciences, 1996 Annual Hawaii Int'l Conf., vol. IV, pp. 54–61, 1996.
Sasisekharan et al. "Data Mining and Forecasting in Large–Scale Telecommunication Network", IEEE Expert Magazine, v11, n1, p. 37–43, Feb. 1996.
"Rush Hour on the Internet Highway", Computer Reseller News, n670, p.33(12), Feb. 1996.
David, Judith R. "Database Gateways: Integrating Heterogenous Data Across the Organization", v10, n8, p3(21), Aug. 1995.
"EMC Provides Data Snapshot Rolls out Data Backup Software that backs up Multiterabyte DBs without Interaction with Network", PC Week, pp. 061, Aug. 1997.

*Primary Examiner*—Paul R. Lintz
*Assistant Examiner*—Charles L. Rones
*Attorney, Agent, or Firm*—John B. Sowell; Mark T. Starr; Steven B. Samuels

[57] ABSTRACT

A database and warehousing system including a media controller which provides instantaneous access of a snapshot of data for offline analysis by a data analysis host. A transaction host sends the data for storage to the media controller. The media controller stores the data in an original copy with a plurality of mirror images. Upon receiving a request for a snapshot of the data, the data analysis generates a snapshot copy by releasing a mirror image or the original copy. The snapshot copy is provided as a snapshot of data to the data analysis host. After completing processing of the snapshot of data, data analysis host sends a return ready signal to the media controller. In response, the media controller updates the mirror image in the snapshot of data and reconnects the updated mirror image to the transaction host.

20 Claims, 3 Drawing Sheets

SYSTEM FOR PROVIDING INSTANTANEOUS ACCESS TO A SNAPSHOT OP DATA STORED ON A STORAGE MEDIUM FOR OFFLINE ANALYSIS

BACKGROUND OF THE INVENTION

1. Field of the Invention

The present invention relates generally to the field of data processing systems, and more particularly to a system for providing instantaneous access to a snapshot of data stored on a storage medium for offline analysis.

2. Related Art

Database and warehousing systems which process large volumes of data are well known in the art. In a typical database and warehousing system 100 shown in FIG. 1, transaction host 101 may generate a large volume of data in a number of transactions and store the data generated on electronic media 103 over path 102 for later processing.

A snapshot of such stored data may be provided later to data analysis host 105 for further processing. A snapshot may be defined with reference to time, that is, a snapshot is generally a copy of all the data currently stored on media 103. To provide a snapshot of the stored data, a new copy of the data is made from electronic media 103 to electronic media 107 (shown by dotted line 104). Data analysis host 105 may then access the new copy on electronic media 107 to process some or all of the data generated by transaction host 101.

For example, transaction host 101 may receive data corresponding to a number of transactions such as airline reservations which occur over a long period of time (e.g., several days to even several years). Each of such transactions may include information corresponding to travel origination, destination, age of passengers and other demographics etc. A copy of all such reservation data may be maintained on electronic media 103. An airline company may desire to analyze the data gathered over a long duration to gather information on, for example, sales trends based on age, destination etc. A new copy of all the reservation data may be provided to data analysis host 105 which may perform several processing steps to generate the results of the desired analysis.

By providing a new copy of the stored data and by having data analysis host 105 work on the new copy, database and warehousing system 100 may avoid data consistency problems. The data consistency problem is explained with an example. For purposes of explanation of data consistency problem only, assume that data analysis host 105 and transaction host 101 operate on the same copy of the transaction data. Data analysis host 105 may examine the transaction data in 'multiple passes'. In each pass, data analysis host 101 may examine some or all of the data existing in the copy. However, transaction host 101 may add more data (or change data) while data analysis host 105 performs multiple passes in examining the transaction data. As data analysis host 101 may not 'know' of such changes in the transaction data while examining the data in multiple passes, the results may be erroneous. Therefore, a snapshot copy is provided to data analysis host 105. As the snapshot copy is not affected by additional data sent by transaction host 101, the data consistency problem is avoided.

While providing a snapshot of data may solve the data consistency problems described above, the copying involved may pose different problems. For example, the amount of data to be copied may be too large, and copying such large volumes of data may consume a lot of time. While such copying is being performed, transaction host 101 may be designed not to accept additional transactions to avoid data consistency problems. Such a design requirement may mean long transaction delays for transaction host 101 throughout the copying time period. Greater the amount of data, longer may be the transaction delay period. Long transaction times may, in some situations, be unacceptable.

In addition, a user of database and warehousing system 100 may want processing to be started on a very short notice. Due to long copying periods, database and warehousing system 100 may not be responsive to such short notice requests.

Thus, what is required is a system which provides instantaneous access to a snapshot of the stored data for further processing.

SUMMARY OF THE INVENTION

The present invention is directed to a system which provides instantaneous access to a snapshot of data stored on a storage medium for offline analysis. The system of the present invention comprises a media controller which includes a means for receiving data from a transaction host. The media controller also includes a means for storing an original copy of the data as a plurality of mirror images. The media controller receives a command requesting a snapshot of the data, and in response, generates a snapshot copy comprising a mirror image of the original copy.

The media controller also connects the snapshot copy to the data analysis host, whereby the data analysis host has instantaneous access to the snapshot copy. The data analysis host further comprises a means for raising a return ready signal indicating that the data analysis host has completed processing data in the snapshot copy. The media controller also includes a means for maintaining a mapping information for the plurality of mirror images, wherein the mapping information indicates whether each of the partitions is comprised in the snapshot copy or the original copy.

The media controller further comprises a means for updating the mirror image in the snapshot copy and reconnecting the updated snapshot copy to the transaction host.

The media controller further includes a means for maintaining a log of the data updates to the original copy between when the snapshot copy is provided to the data analysis host and when the data analysis host raises the return ready signal. The media controller may expedite updating the mirror image in the snapshot copy by utilizing the information in the log.

The media controller also includes a means for copying partitions of the mirror image of the original copy to mirror image of the snapshot copy to update the mirror image of the snapshot copy.

These and other features and advantages of the present invention will be apparent from the description that follows in conjunction with the drawings.

BRIEF DESCRIPTION OF THE FIGURES

The above and further advantages of the present invention may be better understood by referring to the following description taken in conjunction with the accompanying drawings, in which.

DETAILED DESCRIPTION OF PREFERRED EMBODIMENTS

Figure 1:
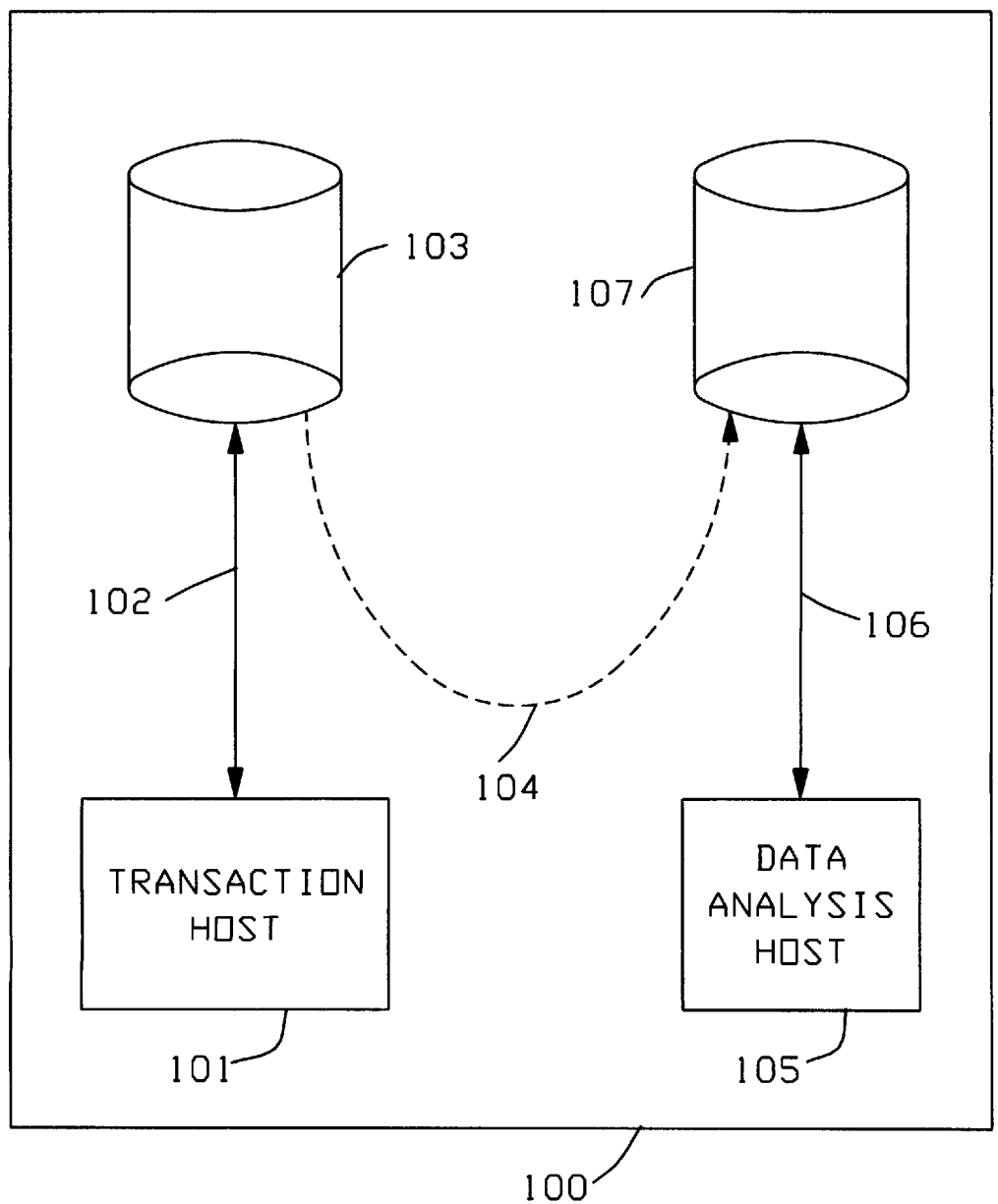
FIG. 1 is a block diagram of a database and warehousing system in which a data analysis host may not have instantaneous access to a snapshot of data generated by a transaction host.
Figure 2:
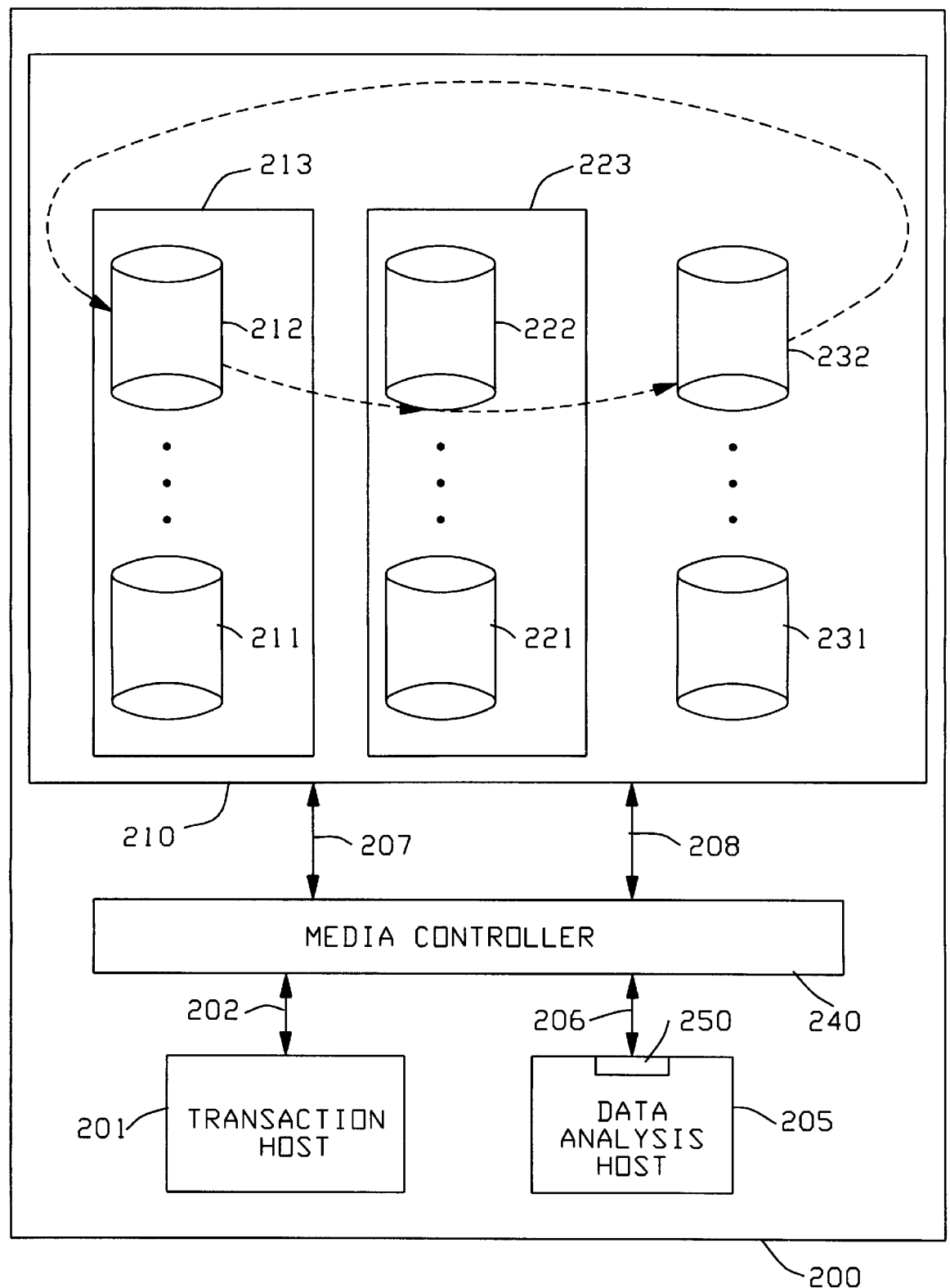
FIG. 2 is a block diagram of the database and warehousing system of the present invention including a media controller which provides instantaneous access to a snapshot of data generated by a transaction host.

FIG. 2 illustrates a database and warehousing system 200, which includes transaction host 201, data analysis host 205, media controller 240, and electronic storage media 210. Transaction host 201 generates transaction data. Transaction data includes any data which may be used for further processing. Media controller 240 stores the transaction data in electronic storage media 210. Data analysis host 205 requests access to a snapshot of the transaction data, and upon receiving such a snapshot processes the transaction data. In response to a request for a snapshot, media controller 240 provides instantaneous access to a snapshot of the transaction data in accordance with the present invention.

Media controller 240 of the present invention stores mirror images of the transaction data on electronic storage media 210. Mirror images are duplicate copies of the same data and any change made to one of the mirror images is propagated to all mirror images. Therefore, media controller 240 updates all the mirror images with each instance of transaction data generated by transaction host 201. Such duplicate copies may be maintained for redundancy and consequent reliability in some computer systems. That is, mirroring is often used where data redundancy is critical, i.e., a failure does not result in loss of data. Each mirror image, which is updated with transaction data, constitutes an 'original copy'.

In response to a request for a snapshot of the transaction data from data analysis host 205, media controller 240 creates a 'snapshot copy' of the transaction data including one or more of the mirror images, and provides the snapshot copy to data analysis host 205. The mirror images provided in the snapshot copy are severed from the original copy. To update (i.e., add, change, or delete data) a snapshot copy, all mirror images of the snapshot copy are also updated. However, updates to the snapshot copy may be performed independent of updates to the original copy, and vice versa.

The snapshot copy contains transaction data updates up until a time the snapshot request is received. To create a snapshot copy, media controller 240 may need to only change some logical mapping as will be further explained below. As such changes may be performed in a very short duration, media controller 240 provides instantaneous access to the snapshot of the transaction data to data analysis host 205.

Figure 3:
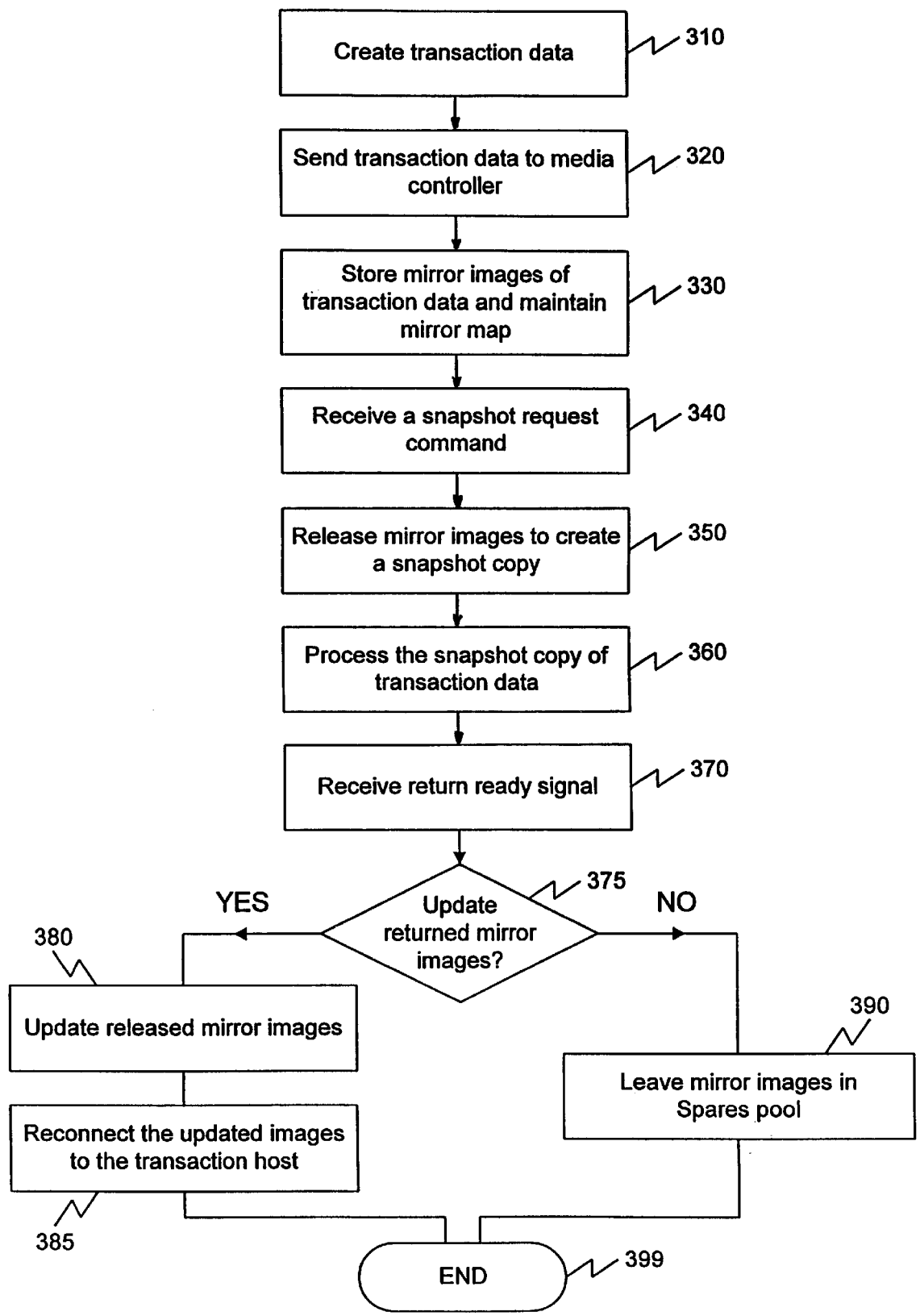
FIG. 3 is a flow chart illustrating the steps performed by the database and warehousing system in accordance with the present invention.

A conventional media controller, such as Symmetrix 5100, can be modified in accordance with the present invention to provide an instantaneous access to a snapshot of transaction data. Further details of the operation of the operation of database and warehousing system 100 are now described with reference to FIGS. 2 and 3. FIG. 3 is a flow-chart illustrating the steps performed by database and warehousing system 100 in accordance with the present invention to process large volumes of data.

In step 310 of FIG. 3, transaction host 201 generates transaction data which may be stored for later processing. In a preferred embodiment, transaction host 201 is a conventional general purpose computer system. Transaction host 201 generates the transaction data and sends the data over communication path 202 to media controller 240, as shown in step 320.

Media controller 240 controls access by transaction host 201 and data analysis host 205 to data on electronic storage media 210. Electronic storage media 210 may include one or more physical units such as physical disk drive units. Such physical units may be logically divided into several physical partitions for easier data management and fault management. Media controller 240 maps logical partitions onto the physical units, and maintains the corresponding mapping information. For the purpose of the present invention, a logical partition may be treated as the same as a physical partition, and both the partitions are accordingly referred to simply as a partition. Media controller 240 uses the mapping information in storing and reading the transaction data associated with a host accessible volume. All partitions of a copy are said to be in a 'volume', i.e., all partitions of mirror images of a copy are said to be in the volume. In a preferred embodiment, all the read and write requests from transaction host 201 and data analysis host 205 are channeled through media controller 240.

In step 330, media controller 240 stores mirror images of the received data on electronic storage media 210. Electronic storage media 210 is shown with two mirror images 213 and 223 of the transaction data. Each of the mirror images 213 and 223 represent an original copy of the transaction data. Obviously, additional mirror images can be provided as would be apparent to one skilled in the art. Mirror image 213 is shown including two partitions 211 and 212, and mirror image 223 is shown including partitions 221 and 222. An original volume (corresponding to the original copy) includes partitions 212, 211, 221, and 222.

Media controller 240 maintains storage status information including a mirror map indicating the mirror images of a copy and the partitions corresponding to each copy. The mirror map also specifies mapping between partitions. In FIG. 2, partitions 211 and 212 are shown copied to duplicate partitions 221 and 222 respectively. Therefore partitions 212 and 222 are mirror images of a portion of the volume of data, and partitions 211 and 221 are mirror images of another portion of the volume of data. Each of the partition pairs 211–212 and 221–222 constitute a mirror image of the transaction data. Partitions 231 and 232 are not in use, and are logically maintained in a spare status by media controller 240. The spare status may mean that the corresponding partitions are available for assignment to other hosts or applications.

In step 340, to request a snapshot of the transaction data, data analysis host 205 sends a snapshot request command to media controller 240 on communication path 206 by using interface 250. Data analysis host 205 may be a conventional computer system modified to cooperatively operate with media controller 240 in accordance with the present invention. Interface 250 may also comprise a conventional interface such as a SCSI interface which operates in conjunction with communication path 206.

Media controller 240 processes the snapshot request command in step 350. Specifically, media controller 240 generates a snapshot copy of the transaction data by 'releasing' at least one of the mirror images of the original copy, and providing the released mirror images as the snapshot copy. To release a mirror image from an original copy, media controller 240 merely changes the mapping information to create the snapshot copy (and a new volume including corresponding partitions), and include the mirror image and associated partitions in the snapshot copy.

After performing step 350 with reference to the partitions in electronic storage media 210 of FIG. 2, the mirror image map includes at least two volumes, one corresponding to the original volume (with partitions 211 and 212) and the other corresponding to the new volume of the snapshot copy (partitions 221, 222). The original volume continues to be related to the original copy, i.e., all updates from transaction host 201 are stored in the original copy with partitions 211 and 212. Such updates are no longer propagated to the snapshot copy, i.e., partitions 221 and 222 since they are no longer part of the original volume/copy.

Prior to the creation of the new volume, as media controller 240 updates each mirror image of the original copy with the transaction data received at each instance, the snapshot copy is a replica of the original volume at the time the snapshot copy is created, and therefore constitutes a snapshot of the transaction data generated by transaction host 201. As already explained, updates to the original copy are no longer propagated to the snapshot copy, thereby avoiding potential data consistency problems. Also, as generating a snapshot copy may involve minimal amount of processing such as changing mapping information, media controller 240 may generate a snapshot copy instantaneously. In addition, the amount of time to provide an additional copy does not depend on the amount of data present in the original copy.

In step 360, data analysis host 205 processes the snapshot of the transaction data using the snapshot copy. Once such processing is complete, data analysis host 205 sends a return ready signal to media controller 240. The return ready signal is used by media controller 240 to optimize the storage space usage on electronic storage media 210 as explained with reference to steps 375–390. To optimize such usage, media controller 240 may update the mirror images in the released copy to synchronize with the mirror images in the original copy, and reconnect the updated mirror images to the original copy as explained below.

In step 375, media controller 240 determines whether to update the mirror images of the snapshot copy with all the updates that have occurred between the time the snapshot copy was created and a present time. If media controller 240 decides not to update the images, the partitions of the returned mirror images are left in a spare pool status in step 390. Media controller 240 may decide not to update the returned images, for example, because the original copy already has a sufficient number of mirror images for a desired reliability and performance level. In a preferred embodiment, media controller 240 maintains at least three mirror images of the transaction data, two for continued use as the original copy and the other for generating a snapshot copy if required.

If media controller 240 decides to update the returned copies in step 375, in one embodiment, media controller 240 may copy transaction data in partitions of one of the mirror images of an original copy to corresponding partitions of mirror images of the snapshot copy. As will be appreciated, the partitions of mirror images of the original copy will include changes corresponding to transaction data updates received since the snapshot copy was created.

In an alternate embodiment, media controller 240 maintains a log of all transaction data updates received starting from when a snapshot copy is created. The snapshot copy is then updated using the log. As will be appreciated, a log may be better suited for environments in which the volume of updates may be low within a given period.

In step 385, media controller 240 integrates the updated mirror images into the volume associated with transaction host 201. To perform such connection, media controller 20 changes the mirror mapping to reflect that the updated mirror images are included in the original volume corresponding to the transaction data.

It will be apparent to one skilled in the art to make several modifications to the above description without departing from the scope and spirit of the present invention. For example, even though data analysis host 205 is described as generating the request snapshot command, it will be appreciated that the command may be optionally generated at a predetermined time, and the data analysis host 205 may be programmed to begin accessing the released mirror images after such predetermined time. It will also be appreciated that the command may be generated from a host other than data analysis host 205 and transaction host 201, or the command may be generated internally by media controller 240.

Also, database and warehousing system 200 may comprise a second data analysis host (not shown), which generates a command requesting another snapshot copy of the transaction data. Media controller 240 may release another mirror image to create the new snapshot copy as explained above, and provide the released mirror image to the second data analysis host. The two data analysis host may operate independently of each other. Each of the two snapshot copies are affected by neither the other snapshot copy nor the original copy. Even though the description provided herein is provided mostly with reference to the first snapshot copy, it should be understood that the description is also applicable to the second snapshot copy.

In addition, media controller 240 may include several volumes, each volume having a different set of transaction data. Media controller 240 maintains mapping information indicating which partitions belong in which volume, and which hosts have access (read access, write access) to each of the volumes. Media controller 240 may maintain a number of mirror images of each volume depending on the specific requirements.

The following example further illustrates the operation of a preferred embodiment in accordance with the present invention.

In Table 1 below, 'Time' column specifies a time-line for each row of the table. The 'Mirror images of Original Copy' column specifies the mirror images maintained by media controller 240 for the original copy of the transaction data at a time corresponding to the row. The 'Mirror images of Snapshot copy' column specifies the mirror images released for the snapshot copy of the transaction data. The snapshot copy provides the snapshot of data for processing by data analysis host 205. The 'Spares' column specifies the mirror images (or the corresponding partitions) that are placed in a spare status. The 'updating' column specifies the snap shot copy mirror images which are being updated at that time to become mirror images of the original copy.

TABLE 1

| Time | Mirror images of Original Copy | Mirror images of Snapshot Copy | Spares | Updating |
|---|---|---|---|---|
| T1 | M1,M2,M3,M4,M5 | | | |
| T2 | M2,M3,M4 | M1,M5 | | |
| T3 | M2,M3,M4 | M1,M5 | | |
| ... | | | | |
| Tn-1 | M2,M3,M4 | M1,M5 | | |
| Tn | M2,M3,M5 | | M1,M5 | |
| Tn + 1 | M2,M3,M5 | | | M1,M5 |

TABLE 1-continued

| Time | Mirror images of Original Copy | Mirror images of Snapshot Copy | Spares | Updating |
|---|---|---|---|---|
| Tn + 2 | M2,M3,M5 | | | M1,M5 |
| ... | | | | |
| Tm − 1 | M2,M3,M5 | | | M1,M5 |
| Tm | M1,M2,M3,M4,M5 | | | |

In the following description with reference to Table 1, mirror images M1–M5 may be treated synonymously with corresponding partitions. For example, at time Tn, mirror image M1 is shown in Spares column. It should be understood that the entry also means that the partitions corresponding to mirror image M1 are placed in a spare status by media controller 240 of the present invention.

At time T1, media controller 240 is shown to maintain five mirror images M1–M5 for an original copy of transaction data. At time T2, media controller 240 receives a request snapshot command from data analysis host 205 and accordingly creates a snapshot copy including mirror images M1 and MS. By providing two mirror images for the snapshot copy, media controller 240 ensures additional reliability in accessing the snapshot data.

Between times T2 and Tn−1, data analysis host 205 processes the transaction data provided in the snapshot copy. Once the processing is complete, at time Tn, data analysis host 105 sends a return ready signal to media controller 240.

As a return ready signal indicates that data analysis host 205 does not need access to the snapshot of data represented by the new volume, media controller 240 of the present invention places the returned mirror images M1 and M5 (or corresponding disk partitions) in spares status. Accordingly, mirror images M1 and M5 are shown in spares column of Table 1 at time Tn.

Media controller 240 determines whether to update the returned copies M1 and M5, or to leave the returned copies M1 and M5 in a spare status for use by other hosts (step 375 of FIG. 3). Assuming that media controller 240 decided to update the returned copies, media controller 240 performs the step of updating (i.e., step 380) during the period between times Tn and Tm. The actual duration between times Tn and Tm depends on the amount of data in the mirror images M2, M3, and M4 in the first embodiment, or on the number of transactions logged in the alternate embodiment described above.

Media controller 20 connects the updated mirror images to transaction host 201, and the 'mirror images of original copy' column accordingly is shown to include all mirror images M1–M5. To perform such connection, media controller 20 may merely need to change the mirror mapping to reflect that the updated mirror images are included in the original volume corresponding to the transaction data.

Therefore, by including a scheme to reconnect the partitions storing the mirror images, database and warehousing system 200 of the present invention may provide additional reliability in providing access to the transaction data. By also including an option to place the partitions corresponding to such snapshot volume in a spare status, the present invention makes available the released partitions for use by other applications, and thus optimizes the use of storage space in electronic storage media 210.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A media controller for providing instantaneous access to a snapshot of data in a large data base to a data analysis host for off-line analysis, the data base information being generated by a transaction host, the media controller comprising:

means for receiving the data from the transaction host;

means for storing an original copy of the data in said data base and an original mirrored copy having a plurality of mirror images;

means for receiving a command from said transaction hosts requesting a snapshot of the data in said data base;

means for providing access to a snapshot copy of the data in said mirror images in response to the command, said snapshot copy comprising one of the plurality of mirror images and the data in the snapshot copy comprising a copy of the original data; and means for coupling the snapshot copy to the data analysis host via said media controller, whereby the data analysis host has instantaneous access to an original copy of the data.

2. The media controller of claim 1 further comprising:

means for receiving a return ready signal; and means for updating the mirror image of the snapshot copy and then coupling the updated mirror image to the transaction host in response to the return ready signal.

3. The media controller of claim 2 further comprising:

means for maintaining a log of updates between when the snapshot of the data is provided to the data analysis host and when the return ready signal is received; and means for updating the mirror image in the snapshot copy according to the log.

4. The media controller of claim 2 wherein each of the mirror images is stored in a plurality of partitions, and the media controller further comprises means for copying the partitions of the mirror images of the original copy to corresponding partitions of the snapshot copy to update the mirror images in the snapshot copy.

5. The media controller of claim 4, further comprising means for maintaining a mapping information for the plurality of mirror images, wherein the mapping information indicates whether each of the partitions is comprised in the snapshot copy or the original copy and a list of hosts that may modify the partitions.

6. The media controller of claim 1, wherein the snapshot copy is provided with a plurality of mirror images.

7. The media controller of claim 6, wherein the media controller provides another snapshot copy of the original copy to an another data analysis host.

8. The media controller of claim 1, wherein the data analysis host sends the command to the media controller.

9. A database and warehousing system, comprising:

a transaction host for generating data for storage in a database for off-line analysis;

a data analysis host for mining said database comprising an interface adapted to send a request for a snapshot of the data generated by the transaction host;

a storage media for storing the data;

a media controller coupled to said transaction host and said interface for providing the snapshot instantaneously in response to the request, the media controller further comprising:

means for receiving the data from the transaction host;

means for storing an original copy of the data in the storage media as an original copy having a plurality of mirror images;

means for receiving a command from the data analysis host requesting a snapshot of the data; and means for providing a snapshot copy of the data to the data analysis host in response to the command, the snapshot copy comprising one of the plurality of mirror images, whereby the data analysis host has instantaneous access to a snapshot of the original data for off-line processing.

10. The database and warehousing system of claim 9 wherein the data analysis host further comprises a means for raising a return ready signal, and wherein the media controller further comprises means for updating the mirror images of the snapshot copy used for off-line processing and then reconnecting the updated mirror images to the transaction host in response to the raising of the return ready signal.

11. The database and warehousing system of claim 10 further comprising:

means for maintaining a log of updates between when the snapshot of the data is provided to the data analysis host and when the data analysis host raises the return ready signal; and means for updating the mirror image in the snapshot copy according to the log.

12. The database and warehousing system of claim 10 wherein each of the mirror images is stored in a plurality of partitions, and the media controller further comprises means for copying the partitions of the mirror images of the original copy to corresponding partitions of the snapshot copy to update the mirror images in the snapshot copy.

13. The database and warehousing system of claim 12, further comprising means for maintaining a mapping information for the plurality of mirror images, wherein the mapping information indicates whether each of the partitions is comprised in the snapshot copy or the original copy and a list of plural hosts that may modify each partition.

14. The database and warehousing system of claim 9, wherein the snapshot copy is provided with a plurality of mirror images.

15. The database and warehousing system of claim 14, said plural hosts further comprises a second data analysis host, and wherein the second data analysis host sends a second command requesting another snapshot copy, and wherein the media controller provides said another snapshot copy comprising a unique one of the plurality of mirror images.

16. A method of providing instantaneous access to a snapshot of a mirrored copy in a data base to be mined by a data analysis host for off-line analysis, the data being generated by a transaction host, the method comprising the steps of:

providing a media controller coupled to said hosts receiving and storing data in the data base, transactions from the transaction host in the form of an original copy having a plurality of mirror images;

generating a command at the data analysis hosts requesting a snapshot of the data in one of said mirror images generating a snapshot of the data from one of the plurality of mirror images in said data base; and coupling the snapshot copy via said media controller to the data analysis host, whereby said data analysis host has instantaneous access to the snapshot copy of said data base, and wherein the analysis host processes the data off-line using the snapshot copy.

17. The method of claim 16 further comprising the steps of:

sending a return ready signal from the data analysis host after the data analysis has completed processing the snapshot of data;

updating the mirror images in the snapshot copy; and reconnecting the mirror images to the transaction host.

18. The method of claim 17 wherein said step of updating further comprises the steps of:

maintaining a log of updates occurring between when the snapshot of data is provided to the data analysis host and when the data analysis host and when the data analysis host raises the return ready signal;

determining whether to update the mirror images in the snapshot copy using the log or to copy original mirror images in the original database copy to the mirror images in the snapshot copy;

updating the mirror image in the snapshot copy according to the log, if the step of determining determines to update using the log; and, if not, copying the mirror images of the original copy to the images in the snapshot copy.

19. The method of claim 17 wherein the step of updating further comprises the steps of:

maintaining a log of updates between when the snapshot is provided to the data analysis host and when the data analysis host raises the return ready signal; and updating the mirror image in the snapshot copy according to the log.

20. The method of claim 17 wherein the step of updating further comprises the step of copying the mirror images of the original copy to the mirror image in the snapshot copy.

\* \* \* \* \*